United States Patent
Yang et al.

(10) Patent No.: US 10,589,961 B2
(45) Date of Patent: Mar. 17, 2020

(54) MAINTENANCE MONITORING OF PASSENGER CARRYING SYSTEM

(71) Applicant: Otis Elevator Company, Farmington, CT (US)

(72) Inventors: Ke Yang, Shanghai (CN); Wenbo Huang, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 16/219,061

(22) Filed: Dec. 13, 2018

(65) Prior Publication Data

US 2019/0185293 A1 Jun. 20, 2019

(30) Foreign Application Priority Data

Dec. 15, 2017 (CN) .......................... 2017 1 1345954

(51) Int. Cl.
*H04W 24/00* (2009.01)
*B66B 5/00* (2006.01)
(Continued)

(52) U.S. Cl.
CPC .......... *B66B 5/0025* (2013.01); *B66B 5/0037* (2013.01); *B66B 5/0087* (2013.01);
(Continued)

(58) Field of Classification Search
CPC . H04W 52/0212; H04W 64/00; H04W 88/02; G08G 5/0013; B66B 5/0025;
(Continued)

(56) References Cited

U.S. PATENT DOCUMENTS 6,202,797 B1   3/2001   Skolnick et al.
7,203,497 B2   4/2007   Belcea
(Continued)

FOREIGN PATENT DOCUMENTS

CN    107103370 A    8/2017
CN    206529176 U    9/2017
(Continued)

OTHER PUBLICATIONS

Karpischek, Stephan, et al., "A Maintenance System Based on Near Field Communication", abstract, 2009 Third International Conference on Next Generation Mobile Applications, Services and Technologies, 2 pages.
(Continued)

*Primary Examiner* — Danh C Le
(74) *Attorney, Agent, or Firm* — Cantor Colburn LLP

(57) ABSTRACT

This invention relates to the maintenance monitoring of passenger transport systems. The maintenance monitoring device for passenger transport systems of this invention comprises a radio/wireless beacon and personal mobile terminal, the radio beacon is roughly installed at an on-site check point of a passenger transport system and is used to broadcast radio signals toward its surroundings, and the personal mobile terminal is carried by the maintenance workers and is used to sense radio signals when the maintenance workers approach the corresponding radio beacon; wherein the personal mobile terminal and/or the radio beacon is configured to calculate the time period information of radio signals broadcast by the corresponding radio beacon and continuously sensed by the personal mobile terminal. This invention can automatically achieve monitoring of maintenance operations, features a good user experience for maintenance operations, and is beneficial to boosting compliance in maintenance operations.

18 Claims, 4 Drawing Sheets

(51) Int. Cl.
*H04W 64/00* (2009.01)
*H04L 29/08* (2006.01)
*H04W 88/02* (2009.01)
*H04M 1/725* (2006.01)

(52) U.S. Cl.
CPC ....... *H04L 29/08558* (2013.01); *H04W 64/00* (2013.01); *H04M 1/72519* (2013.01); *H04M 1/72522* (2013.01); *H04W 88/02* (2013.01)

(58) Field of Classification Search
CPC ........... B66B 5/0037; H04L 29/08558; H04M 1/72519; H04M 1/72522
USPC .......................... 455/425, 550.1, 418, 422.1
See application file for complete search history.

(56) References Cited

U.S. PATENT DOCUMENTS

| | | | |
|---|---|---|---|
| 7,353,142 B2 | 4/2008 | Azpitarte | |
| 7,475,122 B2 | 1/2009 | Azpitarte | |
| 8,014,797 B2 | 9/2011 | Walsh et al. | |
| 8,074,797 B2 | 12/2011 | Sakuragi | |
| 9,092,968 B2 | 7/2015 | Brinton et al. | |
| 9,292,683 B2 | 3/2016 | Prakash et al. | |
| 9,324,217 B2* | 4/2016 | Daniele | G08B 21/0208 |
| 9,324,225 B2 | 4/2016 | Yang et al. | |
| 9,556,002 B2 | 1/2017 | Wilke et al. | |
| 9,734,693 B2 | 8/2017 | McKinley et al. | |
| 9,767,441 B2 | 9/2017 | Eleid et al. | |
| 9,776,847 B2 | 10/2017 | Mondal et al. | |
| 2003/0069648 A1 | 4/2003 | Douglas et al. | |
| 2011/0112943 A1 | 5/2011 | Dietz et al. | |
| 2012/0072356 A1 | 3/2012 | Welty et al. | |
| 2014/0069745 A1 | 3/2014 | Dellarippa et al. | |
| 2014/0213299 A1* | 7/2014 | Marti | G06F 3/048 455/456.3 |
| 2014/0336791 A1 | 11/2014 | Asenjo et al. | |
| 2015/0284214 A1 | 10/2015 | Park | |
| 2015/0351084 A1* | 12/2015 | Werb | H04W 4/70 370/329 |
| 2016/0127875 A1* | 5/2016 | Zampini, II | H04W 4/043 370/311 |
| 2016/0323708 A1* | 11/2016 | Sahadi | H04W 4/023 |
| 2017/0039516 A1 | 2/2017 | Amann | |
| 2017/0223628 A1* | 8/2017 | Snyder | H04W 52/0212 |
| 2018/0095155 A1* | 4/2018 | Soni | G08G 5/0013 |
| 2018/0107576 A1* | 4/2018 | Walden | G06T 7/70 |
| 2018/0308356 A1* | 10/2018 | Voigt | G08G 1/162 |
| 2019/0023528 A1* | 1/2019 | Franco | B66B 1/468 |

FOREIGN PATENT DOCUMENTS

| | | |
|---|---|---|
| JP | 2003063750 A | 3/2003 |
| JP | 2003312956 A | 11/2003 |
| JP | 2016169099 A | 9/2016 |
| WO | 2016193077 A1 | 12/2016 |
| WO | 2017050785 A1 | 3/2017 |

OTHER PUBLICATIONS

Lindeberg, Mats, "Mobility is transforming elevator safety & maintenance", ProntoForms, Jun. 8, 2017, 4 pages.
European Search Report for application EP 18212845.4, dated Oct. 18, 2019, 70 pages.

* cited by examiner

MAINTENANCE MONITORING OF PASSENGER CARRYING SYSTEM

FOREIGN PRIORITY

This application claims priority to Chinese Patent Application No. 201711345954.6, filed Dec. 15, 2017, and all the benefits accruing therefrom under 35 U.S.C. § 119, the contents of which in its entirety are herein incorporated by reference.

TECHNICAL FIELD

This invention belongs to the technical field of passenger transport systems and relates to maintenance monitoring of passenger transport systems.

BACKGROUND ART

The installation and application of passenger transport systems (for example, elevators, escalators, and moving walks) to a variety of buildings is becoming increasingly widespread. Passenger transport system maintenance work is extremely important to the safe operation of passenger transport systems. Therefore, there are maintenance operation flows for various passenger transport systems stipulated or standardized by corresponding industry standards.

Currently, passenger transport system maintenance operations heavily rely on individual maintenance operations personnel for execution. Due to personal discrepancies or subjectivity among maintenance operation individuals, it is difficult to monitor whether maintenance operation individuals are strictly following stipulated or standardized maintenance operation flows (e.g.: predetermined maintenance operation specifications) in their performance of maintenance operations, or the monitoring of the maintenance operation flows of maintenance operation individuals is carried out through manual monitoring.

SUMMARY OF THE INVENTION

According to the first aspect of this invention, it provides a maintenance monitoring device for passenger transport systems, comprising: a radio beacon, which is roughly installed at an on-site check point of a passenger transport system and is used to broadcast radio signals toward its surroundings; and a personal mobile terminal, which is carried by maintenance workers and is used to sense radio signals when the maintenance workers approach the corresponding radio beacon; wherein the personal mobile terminal and/or the radio beacon is configured to calculate the time period information of radio signals broadcast by the corresponding radio beacon and A maintenance monitoring device based on an embodiment of this invention, wherein the personal mobile terminal comprises: a time period information generation unit, which is configured to calculate the time period information of radio signals broadcast by the corresponding radio beacon and continuously sensed by the personal mobile terminal; and a compliance determination unit, which is configured to determine the compliance of the maintenance operations of the maintenance workers at an on-site check point of the corresponding radio beacon based on the time period information.

A maintenance monitoring device based on an embodiment of this invention, wherein it also comprises a maintenance management terminal, wherein the maintenance management terminal comprises: a time period information acquisition unit, which is used to receive the time period information from the personal mobile terminal or radio beacon; and a compliance determination unit, which is used to determine the compliance of the maintenance operations of the maintenance workers at an on-site check point of the corresponding radio beacon based on the time period information.

A maintenance monitoring device based on an embodiment of this invention, wherein the compliance determination unit is also configured to: determine that the maintenance operations of the maintenance worker at a corresponding on-site check point are in compliance when the length of time in the time period information is greater than or equal to a corresponding maintenance time threshold, and if not, determine that the maintenance operations of the maintenance worker at a corresponding on-site check point are not in compliance.

A maintenance monitoring device based on an embodiment of this invention, wherein the personal mobile terminal or the maintenance management terminal also comprises: a maintenance track generation unit, which is configured to generate maintenance track information corresponding to multiple on-site check points based on the chronological relationships of the time period information corresponding to these multiple on-site check points.

A maintenance monitoring device based on an embodiment of this invention, wherein the compliance determination unit is also configured to compare the maintenance track information to predetermined maintenance track information to determine the compliance of the maintenance operations of maintenance workers.

A maintenance monitoring device based on an embodiment of this invention, wherein the personal mobile terminal or the maintenance management terminal also comprises: a prompt information generation unit, which is used to generate corresponding prompt information when the determined compliance results are not in compliance.

A maintenance monitoring device based on an embodiment of this invention, wherein the radio beacon has a corresponding first identifier, and the radio beacon broadcasts the first identifier while broadcasting the radio signals.

A maintenance monitoring device based on an embodiment of this invention, wherein the personal mobile terminal is also configured to identify the first identifier while sensing the radio signals and determine the on-site check point corresponding to the time period information based on the identified first identifier.

A maintenance monitoring device based on an embodiment of this invention, wherein the maintenance management terminal also comprises: a prompt information generation unit, which is used to generate corresponding prompt information when the determined compliance results are not in compliance; and a transmission unit, which is used to transmit at least the prompt information to the personal mobile terminal.

A maintenance monitoring device based on an embodiment of this invention, wherein the radio beacon has a corresponding first identifier, the personal mobile terminal has a corresponding second identifier, and the first identifier is broadcast when the radio signals are broadcast; the personal mobile terminal is also configured to identify the first identifier while sensing the radio signals and to generate and transmit time period information including the first identifier and second identifier.

A maintenance monitoring device based on an embodiment of this invention, wherein the radio beacon is a Bluetooth module and the radio signals are Bluetooth signals, or the radio beacon is a low-power Bluetooth module and the radio signals are low-power Bluetooth signals, or the radio beacon is a Wifi module and the radio signals are Wifi signals.

A maintenance monitoring device based on an embodiment of this invention, wherein the radio beacon is configured to broadcast the radio signals within a predetermined range toward its surroundings; the personal mobile terminal is also configured to determine whether it has entered the predetermined range by determining the signal strength of the radio signals it senses, thereby determining whether the maintenance worker is approaching the radio beacon.

A maintenance monitoring device based on an embodiment of this invention, wherein the personal mobile terminal is configured to be able to automatically sense the radio signals when a wireless connection with the radio beacon has not been established.

According to the second aspect of this invention, it provides a maintenance monitoring method for passenger transport systems, comprising the following steps: sending radio signals broadcast by a radio beacon of an on-site check point roughly installed on the passenger transport system; and calculating the time period information of continuously sensed radio signals broadcast by the corresponding radio beacon.

A maintenance monitoring method based on an embodiment of this invention, wherein it also comprises the following step: generating maintenance track information corresponding to multiple on-site check points based on the chronological relationships of the time period information corresponding to these multiple on-site check points.

A maintenance monitoring method based on an embodiment of this invention, wherein it also comprises the following step: determining the compliance of the maintenance operations of the maintenance workers at an on-site check point of the corresponding radio beacon based on the time period information and/or the maintenance track information.

A maintenance monitoring method based on an embodiment of this invention, wherein, during the step of determining compliance based on time period information, it is determined that the maintenance operations of the maintenance worker at a corresponding on-site check point are in compliance when the length of time in the time period information is greater than or equal to a corresponding maintenance time threshold, and if not, it is determined that the maintenance operations of the maintenance worker at a corresponding on-site check point are not in compliance.

A maintenance monitoring method based on an embodiment of this invention, wherein, during the step of determining compliance based on maintenance track information, the maintenance track information is compared to predetermined maintenance track information to determine the compliance of the maintenance operations of maintenance workers.

A maintenance monitoring method based on an embodiment of this invention, wherein it also comprises the following step: generating corresponding prompt information when the determined compliance results are not in compliance.

A maintenance monitoring method based on an embodiment of this invention, wherein the first identifier of the radio beacon is identified during the sensing step; during the step of calculating the time period information, time period information including the first identifier and the second identifier of the personal mobile terminal is generated.

A maintenance monitoring method based on an embodiment of this invention, wherein the radio signals are Bluetooth signals, low-power Bluetooth signals, or Wifi signals.

A maintenance monitoring method based on an embodiment of this invention, wherein the signal strength of the sensed radio signals is determined during the sensing step.

A maintenance monitoring method based on an embodiment of this invention, wherein, during the step of sensing radio signals, the radio signals are automatically sensed when a wireless connection has not been established with the radio beacon.

According to the third aspect of this invention, it provides a personal mobile terminal used to monitor the maintenance of passenger transport systems by maintenance workers, which can be carried by the maintenance workers; characterized in that the personal mobile terminal comprises: a close-range communications unit, which is configured to sense radio signals broadcast by a radio beacon of an on-site check point roughly installed on the passenger transport system; and a time period information generation unit, which is configured to calculate the time period information of the radio signals broadcast by a corresponding radio beacon and continuously sensed by the close-range communications unit.

A personal mobile terminal based on an embodiment of this invention, wherein the personal mobile terminal also comprises: a maintenance track generation unit, which is configured to generate maintenance track information corresponding to multiple on-site check points based on the chronological relationships of the time period information corresponding to these multiple on-site check points.

A personal mobile terminal based on an embodiment of this invention, wherein it also comprises: a compliance determination unit, which is configured to determine the compliance of the maintenance operations of the maintenance workers at an on-site check point of the corresponding radio beacon, based on the time period information and/or the maintenance track information.

A personal mobile terminal based on an embodiment of this invention, wherein the compliance determination unit is also configured to: determine that the maintenance operations of the maintenance worker at a corresponding on-site check point are in compliance when the length of time in the time period information is greater than or equal to a corresponding maintenance time threshold, and if not, determine that the maintenance operations of the maintenance worker at a corresponding on-site check point are not in compliance.

A personal mobile terminal based on an embodiment of this invention, wherein the compliance determination unit is also configured to compare the maintenance track information to predetermined maintenance track information to determine the compliance of the maintenance operations of maintenance workers.

A personal mobile terminal based on an embodiment of this invention, wherein the personal mobile terminal also comprises: a prompt information generation unit, which is used to generate corresponding prompt information when the determined compliance results are not in compliance.

A personal mobile terminal based on an embodiment of this invention, wherein the close-range communications unit is also configured to identify the first identifier of the radio beacon, and the time period information generation unit is also configured to generate time period information including the first identifier and the second identifier of the personal mobile terminal.

A personal mobile terminal based on an embodiment of this invention, wherein the close-range communications unit is a Bluetooth communication unit, low-power Bluetooth communications unit, or Wifi communications unit.

A personal mobile terminal based on an embodiment of this invention, wherein it also comprises a signal strength determination unit, which is configured to determine the signal strength of the sensed radio signals.

A personal mobile terminal based on an embodiment of this invention, wherein the personal mobile terminal is configured to be able to automatically sense the radio signals when a wireless connection with the radio beacon has not been established.

According to the fourth aspect of this invention, it provides a computer device, comprising a memory, processor, and computer program stored in the memory and which can be run on the processor; when the processor runs the program, it implements the steps of any one of the methods from the second aspect of this invention.

According to the fifth aspect of this invention, it provides a computer-readable storage medium, on which a computer program is stored; this program is run by a processor to implement the steps of any one of the methods from the second aspect of this invention.

According to the sixth aspect of this invention, it provides a radio beacon, used to monitor the maintenance of passenger transport systems by maintenance workers, wherein the radio beacon is roughly installed at an on-site check point of the passenger transport system, and is configured to be able to broadcast radio signals toward its surroundings; the radio beacon comprises: a time period information generation unit, which is configured to calculate the time period information of the radio signals continuously sensed by the personal mobile terminals carried by the maintenance workers.

A radio beacon based on an embodiment of this invention, wherein it also comprises: a time period information transmission unit, which is configured to transmit the time period information to a maintenance management terminal.

A radio beacon based on an embodiment of this invention, wherein the radio beacon has a corresponding first identifier, and the radio beacon is also configured to receive the second identifier of the personal mobile terminal; the time period information generation unit is also configured to generate time period information including the first identifier and the second identifier.

A radio beacon based on an embodiment of this invention, wherein the radio beacon is a Bluetooth module, low-power Bluetooth module, or Wifi module.

According to the seventh aspect of this invention, it provides a maintenance management terminal, which is used to monitor the maintenance of passenger transport systems by maintenance workers, wherein at a minimum, the maintenance management terminal can establish a wireless connection with a personal mobile terminal carried by a maintenance worker; the maintenance management terminal comprises a time period information acquisition unit, which is used to receive time period information from the personal mobile terminal or a radio beacon roughly installed at an on-site check point of the passenger transport system, wherein the time information is the time during which the personal mobile terminal continuously senses the radio signal broadcast by a corresponding radio beacon; and a compliance determination unit, which is used to determine the compliance of the maintenance operations of the maintenance workers at an on-site check point of the corresponding radio beacon based on the time period information.

A maintenance management terminal based on an embodiment of this invention, wherein the maintenance management terminal also comprises: maintenance track generation unit, which is configured to generate maintenance track information corresponding to multiple on-site check points based on the chronological relationships of the time period information corresponding to these multiple on-site check points.

A maintenance management terminal based on an embodiment of this invention, wherein the compliance determination unit is also configured to compare the maintenance track information to predetermined maintenance track information to determine the compliance of the maintenance operations of maintenance workers.

A maintenance management terminal based on an embodiment of this invention, wherein the compliance determination unit is also configured to: determine that the maintenance operations of the maintenance worker at a corresponding on-site check point are in compliance when the length of time in the time period information is greater than or equal to a corresponding maintenance time threshold, and if not, determine that the maintenance operations of the maintenance worker at a corresponding on-site check point are not in compliance.

A maintenance management terminal based on an embodiment of this invention, wherein the maintenance management terminal also comprises: prompt information generation unit, which is used to generate corresponding prompt information when the determined compliance results are not in compliance.

A maintenance management terminal based on an embodiment of this invention, wherein the time information is time period information including a first identifier of the radio beacon and a second identifier of the personal mobile terminal.

The preceding features and operations of this invention will become more evident based on the following description and attached drawings.

DESCRIPTION OF ATTACHED DRAWINGS

Looking at the following detailed description of the attached drawings, the preceding and other objectives and advantages of this invention will become more fully clear, wherein the same or similar elements employ the same labels.

Figure 3:
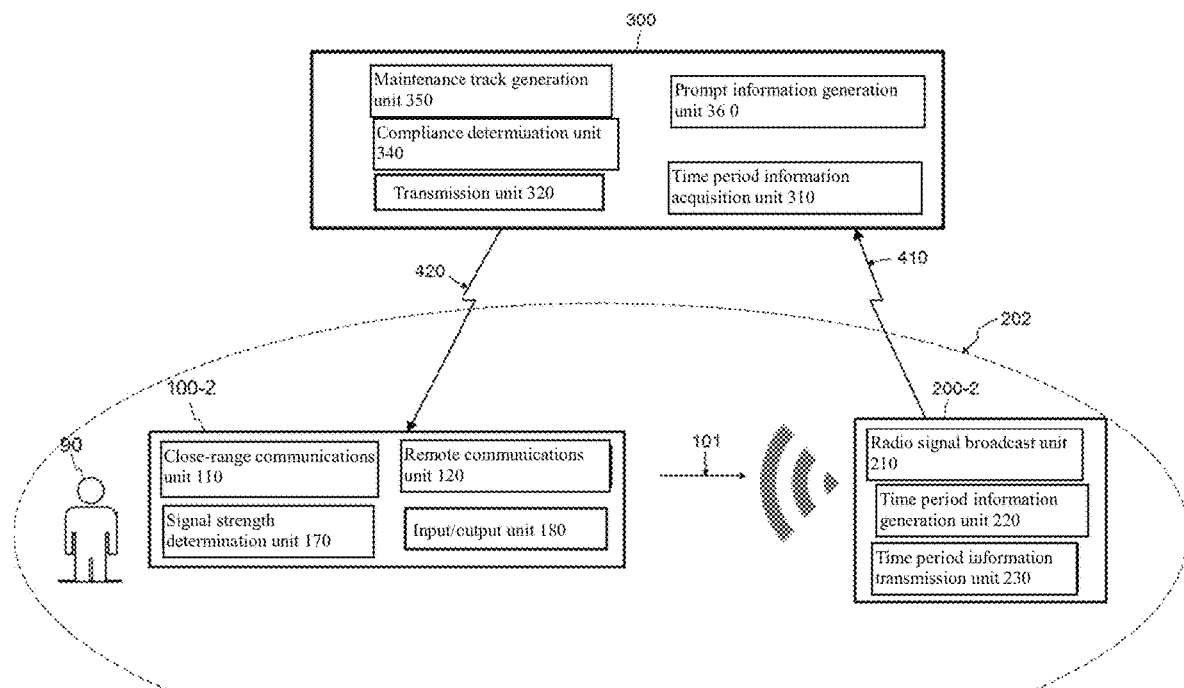
Figure 4:
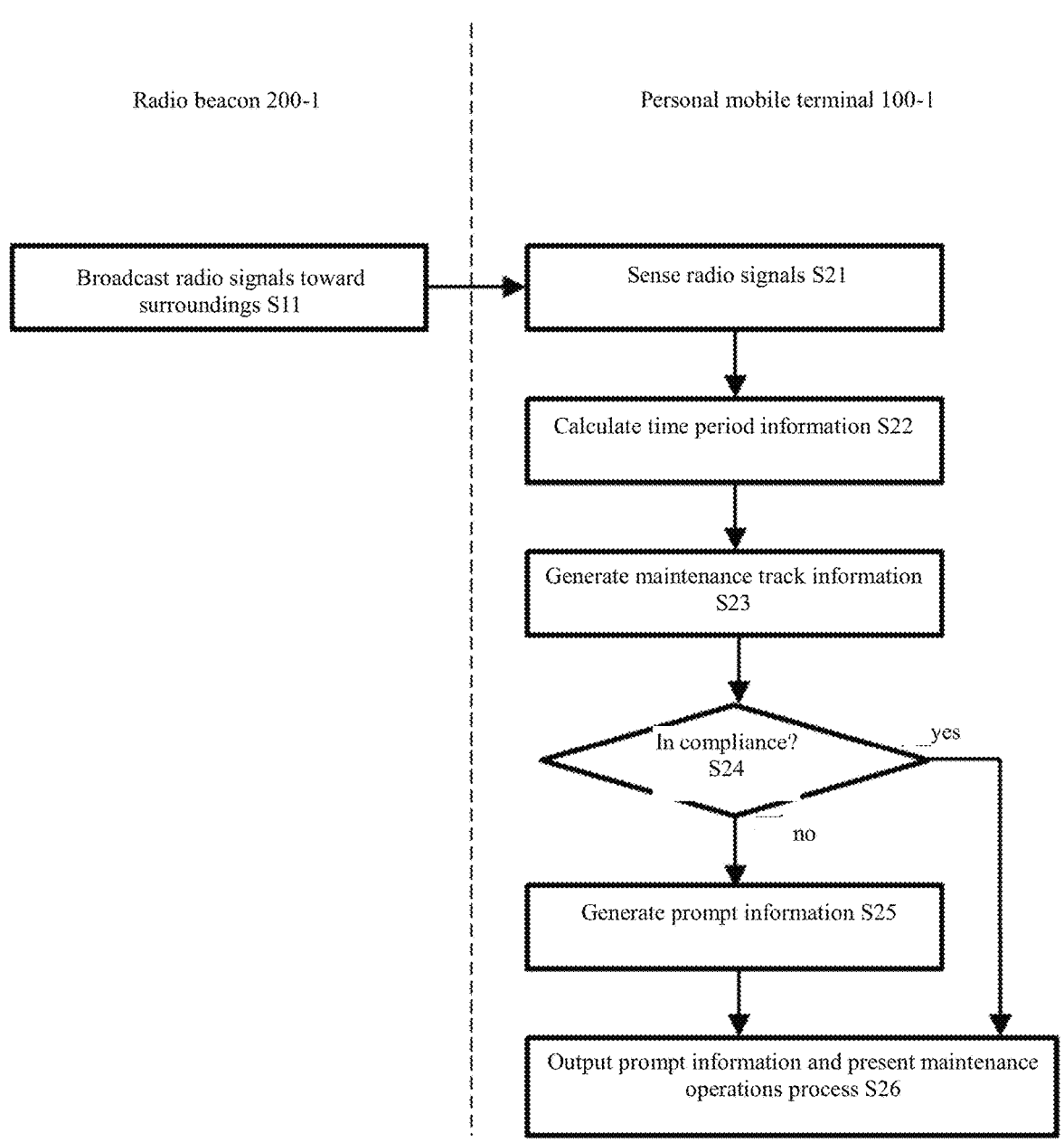

FIG. 3 is a schematic diagram of a maintenance monitoring device for passenger transport systems according to another embodiment of this invention, wherein a personal mobile terminal, radio beacon, and maintenance management terminal of another embodiment of this invention are presented FIG. 4 is a flow diagram of a maintenance monitoring method for passenger transport systems according to an embodiment of this invention.

Figure 5:
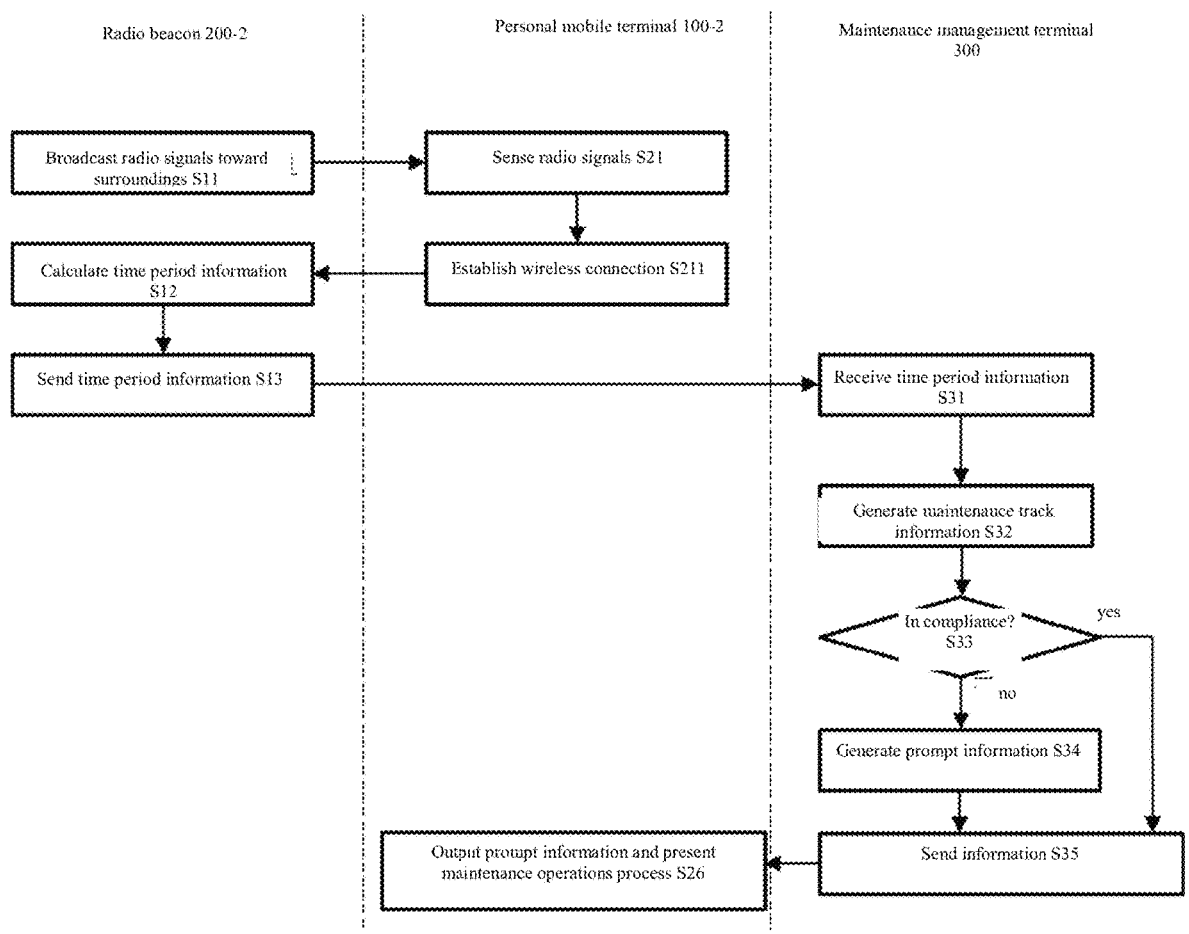

FIG. 5 is a flow diagram of a maintenance monitoring method for passenger transport systems according to another embodiment of this invention

SPECIFIC EMBODIMENTS

Here, a more complete description of this invention is given, referring to the attached drawings; the attached drawings present exemplary embodiments of this invention. However, this invention may be achieved in many different ways and should not be understood as being limited to the embodiments described here. On the contrary, providing these embodiments makes this disclosure more thorough and complete and fully conveys the concepts of this invention to persons skilled in the art. In the attached drawings, identical labels refer to identical elements or components, so their description will be omitted.

Certain block diagrams shown in the drawings are functional entities, and they do not necessarily correspond to independent physical or logical entities. These functional entities can be achieved in software form, or these functional entities can be achieved in one or more hardware modules or integrated circuits, or these functional entities can be achieved in different network and/or processor devices and/or microcontroller devices.

Below, this invention is described by referencing flow diagrams and/or block diagrams based on the methods and devices of the embodiments of this invention. It should be understood that computer program instructions can be used to achieve every flow and/or block in the flow diagrams and/or block diagrams, as well as combinations of flows and/or blocks in the flow diagrams and/or block diagrams. These computer program instructions can be provided to the processor of a general-purpose computer, special-purpose computer, or other programmable data processing device to form a machine, causing the instructions executed by the processor of a computer or other programmable data processing device to create a device used to achieve the specified function/operation components in these flow diagrams and/or blocks and/or multiple flow diagrams.

These computer program instructions can also be stored in computer-readable memory, and these instructions can direct a computer or other programmable processor to achieve functions in a given mode, causing the instructions stored in this computer-readable memory to form a product comprising instruction components achieving the functions/operations specified in one or more blocks of a flow diagram and/or block diagram.

These computer program instructions can also be loaded onto a computer or other programmable data processor, enabling the execution of a series of operations steps on the computer or other programmable processor, to form a computer implementation process. Thus, these instructions executed on the computer or other programmable data processor provide steps for achieving the functions or operations specified in one or more blocks of these flow diagrams and/or block diagrams. It should also be noted that in certain alternative implementations, the functions/operations in the blocks may take place in a sequence other than that shown in the flow diagrams. For example, two blocks presented successively may actually be executed at basically the same time, or these blocks may be executed in reverse order at times. The specifics depend on the functions/operations involved.

In this invention, the passenger transport system may be an elevator system, automatic escalator system, or moving walk system. Below, an example based on elevator system is used to describe the personal mobile terminal, radio beacon, maintenance management terminal, maintenance monitoring device, and maintenance monitoring method of this invention. Based on the following examples, persons skilled in the art will understand that the personal mobile terminal, radio beacon, maintenance management terminal, device, and method of this invention may be analogically applied to use in the maintenance of other types of passenger transport systems, such as escalator systems and moving walk system. The changes, such as applicability, that may be required can be ascertained by persons skilled in the art, guided by the embodiments of this invention.

Figure 1:
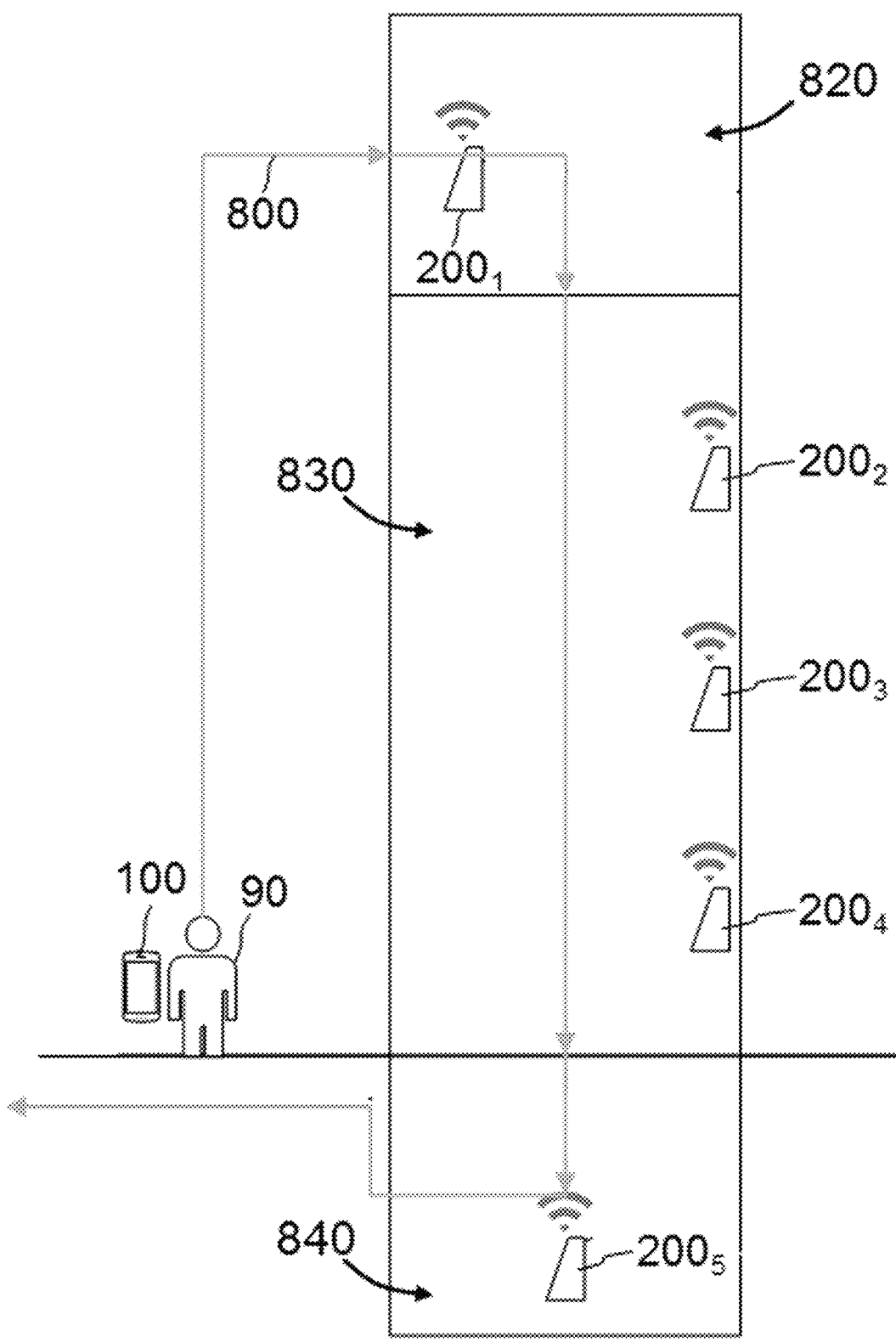
FIG. 1 is an application diagram of a maintenance monitoring device for passenger transport systems according to an embodiment of this invention.
Figure 2:
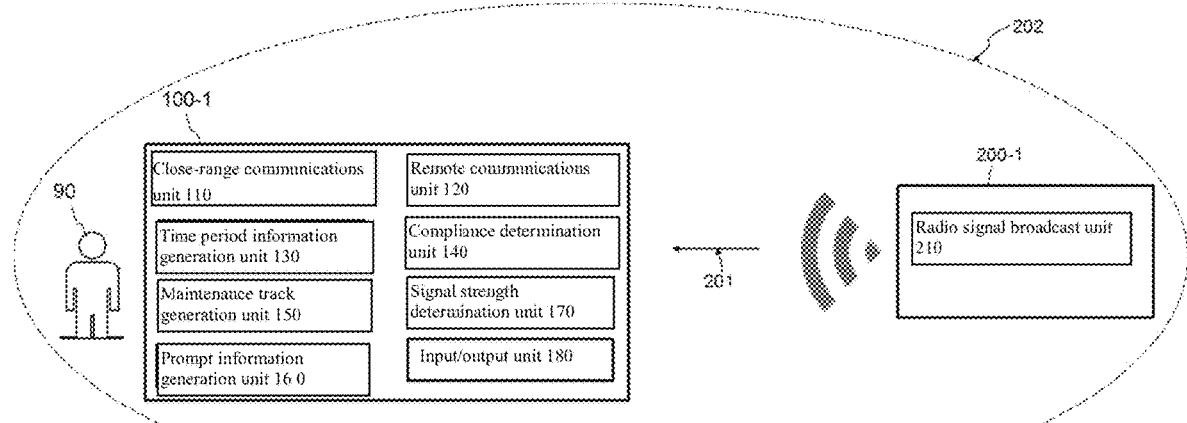
FIG. 2 is a schematic diagram of a maintenance monitoring device for passenger transport systems according to an embodiment of this invention, wherein a personal mobile terminal and radio beacon of an embodiment of this invention are presented.

FIG. 1 is an application diagram of a maintenance monitoring device for passenger transport systems according to an embodiment of this invention; FIG. 2 is a schematic diagram of a maintenance monitoring device for passenger transport systems according to an embodiment of this invention, wherein a personal mobile terminal 100-1 and radio beacon 200-1 of an embodiment of this invention are presented; FIG. 3 is a schematic diagram of a maintenance monitoring device for passenger transport systems according to another embodiment of this invention, wherein a personal mobile terminal 100-2, radio beacon 200-2, and maintenance management terminal 300 of another embodiment of this invention are presented. It is to be understood that the maintenance monitoring devices of the embodiments shown in FIG. 2 and FIG. 3 may be applied in the scenario shown in FIG. 1, to monitor the compliance of the maintenance operation flow of a maintenance operation individual 90.

It should be explained that maintenance operation flows are predefined or set by corresponding standards or specifications, requiring maintenance workers to follow corresponding maintenance operation flows while performing maintenance operations. The specific standards or specifications are not restrictive in nature. For example, there may be different standards or specifications corresponding to different types of passenger transport system or different types of elevators. However, it should be understood that when standards or specifications have already been determined, maintenance operation flows may be determined in advance. For example, maintenance operation tracks (i.e.: predetermined maintenance operation track information) and the maintenance operation times for performance at each on-site maintenance point may be determined in advance in accordance with standards or specifications. When the current maintenance operation fails to satisfy its predetermined maintenance operation flow, the maintenance operation may be said to be not in compliance.

The maintenance monitoring device of the embodiment shown in FIG. 2 may comprise the personal mobile terminal 100-1 and radio beacon 200-1 of an embodiment of this invention. In combination with FIG. 1 and FIG. 2, the following gives detailed illustrations of the personal mobile terminal 100-1, radio beacon 200-1, and maintenance monitoring device of embodiments of this invention.

As shown in FIG. 1, the target of the maintenance operation, i.e.: an elevator system, is installed in a building. For example, it is installed in a machine room 820 and elevator shaft 830, and has a corresponding landing area (e.g.: a lobby landing area); there are corresponding components requiring maintenance in the machine room 820 and/or elevator shaft 830, and a location where there is a concentration of one or more maintained components may be defined as an on-site maintenance point. The specific location and/or specific number of on-site maintenance points are not limited.

As shown in FIG. 1, radio beacons 200 (including the radio beacon 200-1 of the embodiment shown in FIG. 2 and the radio beacon 200-2 of the embodiment shown in FIG. 3) are roughly installed at on-site check points in a machine room 820 and/or elevator shaft 830. For example, radio beacons $200_1$, $200_2$, $200_3$, $200_4$ and $200_5$ may be separately installed on 5 different on-site check points. Each radio beacon 200 is used to continuously broadcast radio signals toward its surroundings. In one embodiment, as shown in FIG. 2 and FIG. 3, radio signals of a corresponding type or frequency may be broadcast through a radio signal broadcast unit 210. Through the broadcast radio signals, it is possible to interact with a personal mobile terminal 100 approach this radio beacon 200.

Personal mobile terminals 100 (including the personal mobile terminal 100-1 of the embodiment shown in FIG. 2 and the personal mobile terminal 100-2 of the embodiment shown in FIG. 3) are carried on maintenance workers 90. In one application scenario, as shown in FIG. 1, a maintenance worker 90 needs to perform maintenance operations on a given elevator system. If the maintenance operations are performed in accordance with maintenance operation specifications, the maintenance worker 90 needs to perform maintenance operations in accordance with the predetermined maintenance track 800 as shown in FIG. 1, e.g.: successively performing maintenance operations at the on-site check points where radio beacons $200_1, 200_2, 200_3, 200_4$ and $200_5$ are located. In one embodiment, as shown in FIG. 2, a personal mobile terminal 100-1 is configured to sense radio signals as the maintenance worker 90 approaches each radio beacon 200-1, and the radio beacon 200-1 is configured to broadcast radio signals within a predetermined range 202 of its surroundings broadcast radio signals. Correspondingly, the personal mobile terminal 100-1 is configured with a signal strength determination unit 170, and the signal strength determination unit 170 can determine the signal strength of the radio signals sensed by the personal mobile terminal 100-1. As an example, the predetermined range 202 represents the radio signal coverage range with a signal strength greater than or equal to a given predetermined value. When the signal strength of the radio signals sensed by the personal mobile terminal 100 is greater than or equal to this predetermined value, it means the personal mobile terminal 100 has entered this predetermined range 202. Therefore, the personal mobile terminal 100 can determine whether it has entered the predetermined range 202 by determining the strength of its sensed radio signals, thereby determining whether the maintenance worker 90 is performing maintenance operations at the on-site check point.

It is to be understood that the predetermined range 202 shown in FIG. 2 may cover one or more components requiring maintenance at the corresponding on-site check point. By defining the predetermined range 202, it means that when the maintenance operation individual 90 performs maintenance operations in compliance at this on-site check point, the signal strength of the radio signals sensed by the personal mobile terminal 100-1 they carry will be greater than or equal to the predetermined value. This way, when the maintenance worker 90 enters the elevator system and performs maintenance operations, they will inevitably need to approach each radio beacon 200-1 (when in compliance with the maintenance operation flow) and sense radio signals. Of course, the predetermined range 202 will not necessarily have the kind of distinct boundary lines shown in FIG. 2. Its boundaries could be area coverage.

It must be clarified that the maintenance workers 90 typically are one or more maintenance personnel, or they could be robots capable of conducting maintenance work. The personal mobile terminal 100, optionally, is a smartphone, wearable smart device (e.g.: a smartband), or personal digital assistant (PAD [sic]), wherein it is set up with a processor and memory, and it can use installed applications (e.g.: APP) to help achieve the functions of the personal mobile terminal 100 in the embodiments of this invention.

In one embodiment, as shown in FIG. 2, the personal mobile terminal 100-1 is configured with a close-range communications unit 110 which, at a minimum, is used to sense radio signals broadcast by radio beacons 200 roughly installed at on-site check points. The personal mobile terminal 100-1 is also configured with a time period information generation unit 130. The time period information generation unit 130 is configured to calculate the time period information of the radio signals broadcast by the corresponding radio beacon 200-1 and continuously sensed by the personal mobile terminal 100-1. It must be clarified that the personal mobile terminal 100-1 separately calculates corresponding time period information for the different radio beacons 200 of different on-site check points. As an example, if a maintenance operation individual 90 is performing maintenance operations at the on-site check point where radio beacon $200_3$ is located, their carried personal mobile terminal 100-1 will be able to continuously sense the radio signals broadcast by radio beacon $200_3$, thus being able to calculate the time period information of the continuously sensed radio signals, e.g.: the length of the time period and points in time from the beginning of sensing radio signals broadcast by radio beacon $200_3$ until the radio signals broadcast by radio beacon $200_3$ are not sensed.

It is to be understood that when the maintenance operation individual 90 leaves a given on-site check point to a certain distance, the personal mobile terminal 100-1 will automatically be unable to sense the radio signals broadcast by the radio beacons 200 installed at that on-site check point. The time period information may comprise the length of the time period and corresponding points in time. The length of the time period can reflect the actual maintenance operations time of the maintenance operation individual 90 at that on-site work point, and the points in time can reflect the time sequence of the locations of maintenance operations by the maintenance operation individual 90 at each on-site work point.

Still looking at FIG. 2, in one embodiment, to enable the personal mobile terminal 100-1 to ascertain which radio beacon 200-2 of which elevator system is transmitting the radio signals it senses, the radio beacons 200 also have corresponding identifiers (ID) 201, and this ID 201 is broadcast at the same time the radio signals are broadcast. Correspondingly, at the same time the personal mobile terminal 100 (e.g.: its close-range communications unit 110) automatically senses radio signals, it identifies this ID 201, and the time period information generation unit 130 generates and transmits time period information including the ID 201. When the personal mobile terminal 100-1 has a corresponding identifier (ID) 101, the time period information generation unit 130 can generate and transmit time period information including ID 101 and ID 201. This way, the user of the time period information can ascertain the specific identities of the interacting personal mobile terminal 100 and radio beacon 200.

In one embodiment, the ID 201 of the radio beacons 200 can be uniformly allocated, e.g.: uniformly allocating digital footprints, thereby preventing the personal mobile terminal 100-1 from falsifying corresponding time period information.

When, for example, the radio beacon 200-1 is a Bluetooth module (e.g.: a low-power Bluetooth module BLE), the radio signals it broadcasts are Bluetooth signals (e.g.: low-power Bluetooth signals). Correspondingly, the close-range communications unit 110 of the personal mobile terminal 100-1 is a Bluetooth communications unit; it can receive Bluetooth signals and simultaneously identify the ID 201 of the radio beacon 200-1 broadcasting these Bluetooth signals. In one embodiment, the personal mobile terminal 100 or close-range communications unit 110 can automatically sense these Bluetooth signals when it has not established a Bluetooth connection with the radio beacon 200-1, and can identify the ID 201 of in the Bluetooth signals, and even the signal strength determination unit 170 can automatically detect the signal strength of the received Bluetooth signals when it has not established a Bluetooth connection with the radio beacon 200. This way, it is possible to achieve the automatic sensing (e.g.: it can be automatically carried out without manipulation) of radio signals, thereby making it possible to carry out the acquisition of the time interval information for each on-site check point in a manipulation-free manner, and even making it possible to carry this out without the knowledge of the maintenance operation individual 90. In addition, the completion of this process is swift and convenient; it is not necessary to take up the connection capacity or connection channels of the radio beacon 200-1.

When, for example, the radio beacon 200-1 is a Wifi module, the radio signals it broadcasts are Wifi signals. Correspondingly, the close-range communications unit 110 of the personal mobile terminal 100-1 is a Wifi communications unit; it can receive Wifi signals and simultaneously identify the ID 201 of the radio beacon 200 broadcasting these Wifi signals. In one embodiment, the personal mobile terminal 100-1 or close-range communications unit 110-1 can automatically sense these Bluetooth [sic] signals when it has not established a Wifi connection with the radio beacon 200, and can identify the ID 201 of in the Wifi signals, and even the signal strength determination unit 170 can automatically detect the signal strength of the received Wifi signals when it has not established a Wifi connection with the radio beacon 200-1. This way, it is possible to achieve the automatic sensing (e.g.: it can be automatically carried out without manipulation) of radio signals, thereby making it possible to carry out the acquisition of the time interval information for each on-site check point in a manipulation-free manner, and even making it possible to carry this out without the knowledge of the maintenance operation individual 90. In addition, the completion of this process is swift and convenient; it is not necessary to take up the connection capacity or connection channels of the radio beacon 200-1.

In another example, the radio beacon 200-1 can be an infrared signal transmission component. Correspondingly, the close-range communications unit 110 of the personal mobile terminal 100-1 can be configured as an infrared sensor. In another example, the radio beacon 200-1 can be a near field communication (NFC) signal transmission component. Correspondingly, the close-range communications unit 110 of the personal mobile terminal 100-1 can be configured as an NFC communications unit. Of course, in this example, the distance of the near field communications is relatively limited.

It must be understood that the specific type of radio beacon 200 is not limited to the preceding examples. It can be another type of radio beacon capable of achieving the same or similar functions.

Still looking at FIG. 2, in this embodiment, compliance determinations regarding maintenance operations are carried out in the personal mobile terminal 100-1. Therefore, the personal mobile terminal 100-1 is correspondingly set up with a compliance determination unit 140. At a minimum, the compliance determination unit 140 can determine the compliance of the maintenance operations of the maintenance worker 90 at an on-site check point with a corresponding radio beacon 200, based on time period information. Specifically, the personal mobile terminal 100-1 or compliance determination unit 140 can store set maintenance time thresholds T corresponding to each on-site check point (this maintenance time threshold may be determined based on maintenance operation specifications). The compliance determination unit 140 is also configured to determine that the maintenance operations of the maintenance worker 90 at a corresponding on-site check point are in compliance when the time length t in the time period information is greater than or equal to the corresponding maintenance time threshold T, and if not, it determines that the maintenance operations of the maintenance worker 90 at the corresponding on-site check point are not in compliance.

As an example, if the maintenance operation specifications stipulate that no less than 30 minutes of maintenance operations are required for components or apparatus at the on-site check point of radio beacon $200_3$, the maintenance time threshold T3 of this on-site check point can be set as 30 minutes. If the duration of the maintenance worker's 90 maintenance operations at this on-site check point is less than 30 minutes, the time length t3 of the time period information calculated and generated by the personal mobile terminal 100-1 will be less than the maintenance time threshold T3, and the compliance determination unit 140 will automatically determine that the maintenance operations of the maintenance worker 90 at this on-site check point are not in compliance; conversely, it would automatically determine that they are in compliance.

Still looking at FIG. 2, the personal mobile terminal 100-1 can also be set up with a maintenance track generation unit 150. The maintenance track generation unit 150 is configured to use the chronological relationships of the time period information for multiple on-site check points to generate maintenance track information corresponding to these multiple on-site check points. As shown in FIG. 1, based on the points in time in the time period information, it is possible to determine the chronological relationship in the sensing of radio signals from radio beacons $200_1$, $200_2$, $200_3$, $200_4$ and $200_5$ by a given personal mobile terminal 100-1. Thus, it is possible to determine the maintenance track of the maintenance worker 90 and generate corresponding maintenance track information. In one embodiment, the compliance determination unit 140 can also determine the compliance of the maintenance operations of a maintenance worker 90 at the on-site check points of the corresponding radio beacons based on maintenance track information generated by the maintenance track generation unit 150. As an example, predetermined maintenance track information 800 for multiple on-site check points is stored in the personal mobile terminal 100-1 or compliance determination unit 140; these are compliant maintenance tracks. The compliance determination unit 140 compares the generated maintenance track information to the stored predetermined maintenance track information 800 to determine the compliance of the maintenance worker's maintenance operations. For example, if the maintenance worker 90 performs maintenance operations from the top to the bottom of the elevator shaft 830, the personal mobile terminal 100-1 will successively sense the radio signals of radio beacons $200_5$, $200_4$, $200_3$, and $200_2$, and the points in time of the corresponding generated time period information will reflect the order relationship of these maintenance operations. Therefore, when the generated maintenance track information differs sharply from the predetermined maintenance track information 800, it can be determined that the maintenance operations of the maintenance worker 90 at the on-site check points of radio beacons $200_5$, $200_4$, $200_3$, and $200_2$ are not in compliance. For example, this is primarily expressed as a compliance failure with regard to the sequence of maintenance operations.

Still looking at FIG. 2, the personal mobile terminal 100-1 can also be set up with a prompt information generation unit 160. The prompt information generation unit 160 can receive the compliance results determined by the compliance determination unit 140, such as "in compliance" and "not in compliance". The prompt information generation unit 160 can generate corresponding promptly information when the determined compliance results are "not in compliance", such as generating corresponding voice prompt information and/or vibration prompt information. The maintenance worker 90 can become aware of or ascertain this prompt information and its meaning in a timely fashion, which is beneficial to promptly correcting maintenance operation errors or making prompt maintenance operation compensations.

Still looking at FIG. 2, the personal mobile terminal 100-1 can also be set up with a corresponding input/output unit 180. For example, this could be a keyboard, display screen, or speech device. The prompt information can be output through the input/output unit 180, and the monitored maintenance operations process can be dynamically presented on the input/output unit 180 (such as a display screen). An example would be dynamically presenting completed maintenance track information, while also presenting the compliance status for each on-site check point (the compliance results determined by the compliance determination unit 140, such as "in compliance" and "not in compliance"). A timely prompt can be made through this output or presented information when the maintenance operations of a maintenance worker 90 are not in compliance, and the maintenance worker 90 can promptly grasp, on-site, the compliance status of their maintenance operations. For example, when the generated maintenance track information covers all on-site check points and the on-site check points are labeled as "in compliance" (for example, using color coding), the maintenance worker 90 can ascertain that the maintenance operations have basically been completed in a compliant fashion.

The maintenance monitoring device of the embodiment shown in FIG. 2 does not rely upon a third party maintenance management terminal 300, as does the embodiment shown in FIG. 3. Its implementation is relatively easy and low-cost.

In another embodiment, as shown in FIG. 3, the generation and transmission of time period information may be carried out by a radio beacon 200-2. As shown in FIG. 3, the radio beacon 200-2 has a time period information generation unit 220. The time period information generation unit 220 is configured to calculate time period information 410 based on the radio signals continuously sensed by the personal mobile terminal 100-2 carried by the maintenance worker 90. For example, the time period information 410 can be transmitted by the time period information transmission unit 230 in the radio beacon 200-2 to the maintenance management terminal 300. Specifically, when the personal mobile terminal 100-2 successfully senses radio signals, it can establish a wireless connection with the radio beacon 200-2 (such as a Bluetooth connection), feedback corresponding signals to conduct a notification that the radio signals broadcast by the radio beacon 200-2 have been successfully sensed by the personal mobile terminal 100, and then trigger the time period information generation unit 220 to begin timekeeping (for example, generating a corresponding timestamp), until the personal mobile terminal's 100-2 sensing of radio signals fails, when it feeds back corresponding signals to conduct a notification that the radio signals broadcast by the radio beacon 200-2 are not being sensed by the personal mobile terminal 100, and then triggers the time period information generation unit 220 to halt timekeeping (for example, generating a corresponding timestamp). Then it can calculate and generate corresponding time period information 410, and the time period information transmission unit 230 transmits the corresponding time period information 410. Because the time period information 410 is generated through each radio beacon 200-2, it avoids having the personal mobile terminal 100-2 circumvent monitoring through fake time period information.

Still looking at FIG. 3, the radio beacon 200-2 can have a corresponding ID 201, enabling the radio beacon 200 to ascertain which personal mobile terminal 100-2 is sensing radio signals. The personal mobile terminal 100-2 also has a corresponding identifier (ID) 101, and this ID 101 is transmitted to the radio beacon 200-2 when the wireless connection is established. Correspondingly, the radio beacon 200 receives this ID 101, and the time period information generation unit 220 can generate time period information 410 containing ID 101 and ID 201. Thus, the receiver or user of the time period information 410 can ascertain the specific identities of the interacting personal mobile terminal 100-2 and radio beacon 200-2.

Still looking at FIG. 3, the maintenance monitoring device also comprises a maintenance management terminal 300. The corresponding functional units of the personal mobile terminal 100-1 of the embodiment shown in FIG. 2 can be implemented in the maintenance management terminal 300. For example, the maintenance operation compliance determination is implemented in the maintenance management terminal 300. The maintenance management terminal 300 can establish a connection with one or more elevator system radio beacons 200-2, and it can establish connections with one or more personal mobile terminals 100-2. For example, it can establish connections through a wireless network. Specifically, the maintenance management terminal 300 can be implemented through a server or cloud terminal.

It must be clarified, for the sake of a concise description, FIG. 3 only indicates the connection between the radio beacon 200-2 of an elevator system and the maintenance management terminal 300, or the connection between a personal mobile terminal 100-2 and the maintenance management terminal 300. It is to be understood that the maintenance management terminal 300 can be used to manage the maintenance work of multiple elevator systems. For example, it can simultaneously establish connections with multiple personal mobile terminals 100 and/or multiple radio beacons 200.

In one embodiment, as shown in FIG. 3, a time period information acquisition unit 310 is set up in the maintenance management terminal 300. It is used to receive time period information 410 from the radio beacon 200-2. The maintenance management terminal 300 may also be set up with one or more of the following: a compliance determination unit 340, maintenance track generation unit 350, and prompt information generation unit 360. It must be clarified that the compliance determination unit 340, maintenance track generation unit 350, and prompt information generation unit 360 of the maintenance management terminal 300 can have the functions and/or configurations corresponding to the compliance determination unit 140, maintenance track generation unit 150, and prompt information generation unit 160 of the personal mobile terminal 100-1 in the embodiment shown in FIG. 2. Therefore, the descriptions will not be repeated here.

Correspondingly, one or more of the compliance determination unit 140, maintenance track generation unit 150, and prompt information generation unit 160 of the personal mobile terminal 100-1 in the embodiment shown in FIG. 2 may be omitted from the personal mobile terminal 100-2.

Still looking at FIG. 3, the personal mobile terminal 100-2 can establish a wireless connection with the maintenance management terminal 300 through a remote communications unit 120. For example, a wireless network connection can be established, thereby achieving data transmission between the two. Specifically, the maintenance management terminal 300 can have a transmission unit 320. The transmission unit 320 can transmit results output by the compliance determination unit 340, maintenance track generation unit 350, and prompt information generation unit 360 to the corresponding personal mobile terminal 100-2 in real time. Correspondingly, the personal mobile terminal 100-2 can have a corresponding input/output unit 180. Thus, like personal mobile terminal 100-1, personal mobile terminal 100-2 can output prompt information in real time and present the maintenance operations process.

The maintenance monitoring device of the preceding embodiment can automatically perform monitoring of the maintenance times for each on-site check point, for example, when the maintenance worker 90 is performing maintenance operations. When radio beacons such as Bluetooth modules, low-power Bluetooth modules, and WiFi modules are used, it is even possible to automatically perform monitoring of the maintenance operations of each maintenance operation individual in a manipulation-free fashion, without adding to the workload of the maintenance operation individual. Maintenance operations monitoring is simply implemented, thus it is beneficial to boosting compliance in maintenance operations and also boosting the quality and effects of maintenance operations.

FIG. 4 shows the flow diagram of a maintenance monitoring method for passenger transport systems according to an embodiment of this invention. In the maintenance monitoring method of this embodiment, time period information is calculated and generated by the personal mobile terminal 100. In combination with FIG. 1, FIG. 2, and FIG. 4, the following gives detailed illustrations of the maintenance monitoring method of this invention embodiment.

During the maintenance process, a radio beacon 200-1 roughly installed at an on-site check point of an entry elevator system broadcasts radio signals toward its surroundings, i.e.: Step S11. Here, the radio signals can be continuously broadcast. For example, they can basically cover a predetermined range 202 as shown in FIG. 2. In one embodiment, the radio beacon 200 has a corresponding ID 201. In Step S11, the ID 201 is broadcast simultaneously with the radio signals.

When a maintenance worker 90 approaches the radio beacon 200-1 (for example, performing maintenance operations at this on-site check point), the personal mobile terminal 100-1 carried by the maintenance worker 90 automatically senses these radio signals, i.e.: Step S21. In one embodiment, the radio beacon 200-1 has a corresponding ID 201, and the personal mobile terminal 100-1 has a corresponding ID 101. In Step S21, the ID 201 of the radio beacon 200-1 is also identified. In one embodiment, this sensing process can be automatically carried by the personal mobile terminal 100-1, e.g.: carried out without manipulation by the maintenance worker 90.

In response to the personal mobile terminal 100 successfully sensing the radio signals of the radio beacon 200-1, time period information for the continuously sensed radio signals broadcast by the radio beacon 200-1 is automatically calculated, i.e.: Step S22. In one embodiment, in Step S22, time period information containing ID 201 and ID 101 is generated. This way, the user of the time period information can ascertain which maintenance worker 90 is performing maintenance operations at which on-site check point of which elevator system. Also, the authenticity of the time period information can be verified through authentication of the ID 201.

Maintenance track information corresponding to multiple on-site check points is generated based on the chronological relationships of the time period information corresponding to multiple on-site check points, i.e.: Step S23. This way, the personal mobile terminal 100 can automatically and dynamically obtain maintenance track information. For example, Step S23 can be carried out through the maintenance track generation unit 150 of the personal mobile terminal 100-1.

At a minimum, it is possible to determine the compliance of the maintenance operations performed by a maintenance worker 90 at the on-site check point of a corresponding radio beacon 200-1 based on time period information and/or maintenance track information, i.e.: Step S24. For example, Step S24 can be carried out through the compliance determination unit 140 of the personal mobile terminal 100-1. In one embodiment, the compliance determination unit 140 is also configured to determine that the maintenance operations of the maintenance worker 90 at a corresponding on-site check point are in compliance when the time length tin the time period information is greater than or equal to the corresponding maintenance time threshold T, and if not, it determines that the maintenance operations of the maintenance worker 90 at the corresponding on-site check point are not in compliance. The generated maintenance track information is compared to stored predetermined maintenance track information 800 to determine the compliance of the maintenance operations of the maintenance worker 90.

When "no" is determined, that is, when the determined results are "not in compliance", the process moves to Step S25 and corresponding prompt information is generated, such as generating corresponding voice prompt information and/or vibration prompt information. For example, Step S25 may be carried out through the prompt information generation unit 160 of the personal mobile terminal 100-1. The maintenance worker 90 can become aware of or ascertain this prompt information and its meaning in a timely fashion, which is beneficial to promptly correcting maintenance operation errors or making prompt maintenance operation compensations.

The personal mobile terminal 100-2 can output or present the results of Step S23 through S25, such as outputting prompt information and presenting the maintenance operations process, i.e.: S26. In one embodiment, this prompt information can be output through the input/output unit 180, and the monitored maintenance operations process can be dynamically presented on the input/output unit 180 (such as a display screen). An example would be dynamically presenting completed maintenance track information, while also presenting the compliance status for each on-site check point (the compliance results determined by the compliance determination unit 140, such as "in compliance" and "not in compliance"). A timely prompt can be made through this output or presented information when the maintenance operations of a maintenance worker 90 are not in compliance, and the maintenance worker 90 can promptly grasp, on-site, the compliance status of their maintenance operations. For example, when the generated maintenance track information covers all on-site check points and the on-site check points are labeled as "in compliance" (for example, using color coding), the maintenance worker 90 can ascertain that the maintenance operations have basically been completed in a compliant fashion.

FIG. 5 shows a flow diagram of a maintenance monitoring method for passenger transport systems according to another embodiment of this invention. In the maintenance monitoring method of this embodiment, time period information is transmitted by the radio beacon 200 to the maintenance management terminal 300, and the corresponding maintenance track information generation step (S32), compliance determination step (S33), and prompt information generation step (S34) are carried out at the maintenance management terminal 300. In combination with FIG. 1, FIG. 3, and FIG. 5, the following gives detailed illustrations of the maintenance monitoring method of this invention embodiment.

During the maintenance process, a radio beacon 200-2 roughly installed at an on-site check point of an entry elevator system broadcasts radio signals toward its surroundings, i.e.: Step S11. Here, the radio signals can be continuously broadcast. For example, they can basically cover a predetermined range 202 as shown in FIG. 3.

When a maintenance worker 90 approaches the radio beacon 200-2 (for example, performing maintenance operations at this on-site check point), the personal mobile terminal 100-2 carried by the maintenance worker 90 automatically senses these radio signals, i.e.: Step S21.

A wireless connection is established between the personal mobile terminal 100-2 and the radio beacon 200-2, i.e.: Step S211. For example, a Bluetooth connection can be automatically established. In one embodiment, the ID 101 of the personal mobile terminal 100-2 is also transmitted to the radio beacon 200-2. When this wireless connection is established, the radio beacon 200-2 can ascertain which personal mobile terminal 100-2 has successfully automatically sensed the radio signals it is broadcasting.

In response to the personal mobile terminal 100 successfully sensing the radio signals, the radio beacon 200-2 automatically calculates the time period information 420 for the continuously sensed radio signals broadcast by the radio beacon 200-2, i.e.: Step S12. This Step S12 can be carried out in the time period information generation unit 220 of the radio beacon 200-2. In one embodiment, in steps S12, time period information containing ID 201 and ID 101 is generated. This way, the receiver or user of the time period information (for example, the maintenance management terminal 300) can ascertain which maintenance worker 90 is performing maintenance operations at which on-site check point of which elevator system.

Furthermore, this time period information 410 is transmitted to the maintenance management terminal 300, i.e.: Step S13. Correspondingly, the maintenance management terminal 300 receives time period information 410 from the radio beacon 200-2, i.e.: Step S31.

Maintenance track information corresponding to multiple on-site check points is generated based on the chronological relationships of the time period information corresponding to multiple on-site check points, i.e.: Step S32. For example, Step S23 can be carried out through the maintenance track generation unit 350 of the maintenance management terminal 300.

At a minimum, it is possible to determine the compliance of the maintenance operations performed by a maintenance worker 90 at the on-site check point of a corresponding radio beacon 200-2 based on time period information and/or maintenance track information, i.e.: Step S33. For example, Step S33 can be carried out through the compliance determination unit 340 of the maintenance management terminal 300.

When "no" is determined, that is, when the determined results are "not in compliance", the process moves to Step S34 and corresponding prompt information is generated, such as generating corresponding voice prompt information and/or vibration prompt information. For example, Step S34 may be carried out through the prompt information generation unit 360 of the maintenance management terminal 300.

Furthermore, the maintenance management terminal 300 can transmit the results from Steps S32 through S34 to the personal mobile terminal 100-2 in real time, i.e.: Step S35.

The personal mobile terminal 100-2 correspondingly receives the results transmitted by the maintenance management terminal 300, outputs prompt information, and presents the maintenance operations process, i.e.: S26.

It is to be understood that the maintenance monitoring device and maintenance monitoring method of the preceding embodiments may be applied to a corresponding elevator system, escalator system, or moving walk system.

A person skilled in the art will understand that the aspects of this invention can be embodied as systems, methods, or computer program products. Therefore, the aspects of this invention may employ the following forms: a purely hardware implementation scheme, purely software implementation scheme (comprising firmware, resident software, microcode, etc.), or what, in this text, could generally be called a "service", "circuit", "circuit system", "module", and/or "processing system" implementation scheme combining software and hardware aspects. Also, the aspects of this invention may employ the form of a computer program product in one or more computer-readable media with computer-readable program code.

Any combination of one or more computer-readable media may be used. Computer-readable media may be computer-readable signal media or computer-readable storage media. Computer-readable storage media include but are not limited to electronic, magnetic, optical, electromagnetic, infrared, or semiconductor systems, apparatus, or devices, or any suitable combination of the above. The following are more specific examples of computer-readable storage media (this is a non-exhaustive list): an electrical connection with one or more electrical wires, portable computer disk, hard drive, random-access memory (RAM), read-only memory (ROM), erasable programmable read-only memory (EPROM or flash memory), optical fiber, portable compact disc read-only memory (CD-ROM), optical storage device, magnetic storage device, or any suitable combination of these. In the context of this document, computer-readable storage media can contain or store any physical media for use by or in combination with an instruction execution system, apparatus or device.

The program code and/or executable instructions on computer-readable media may use any suitable media for transmission, comprising but not limited to wireless, wired, fiber-optic cable, and RF options, or any suitable combination of these.

The computer program code used to implement the operations of the aspects of this invention may be written using any combination of one or more programming languages, including object-oriented programming languages such as Java, Smalltalk, and C++, and traditional programming languages such as "C" programming language or a similar programming language. The program code may be entirely executed on the user's computer (device), partially executed on the user's computer, executed as an independent software bundle, partially executed on the user's computer and partially executed on a remote computer, or entirely executed on a remote computer or server. In the latter scenario, the remote computer may be connected to the user's computer through any type of network, including local area networks (LAN) or wide area networks (WAN), or it may be connected to an external computer (for example, using an Internet service provider for a connection through the Internet).

The computer program instructions may be provided to the processor of a general-purpose computer, special-purpose computer such as an image processor, or other programmable data processing apparatus to produce a machine, enabling the instructions executed by the computer's processor or other programmable data processing apparatus to create a mode used to achieve the function/actions specified in one or more blocks of the flow diagrams and/or block diagrams.

The computer program instructions can also be loaded onto a computer, other programmable data processing apparatus, or other device, to cause a series of operation steps to be executed on the computer, other programmable apparatus, or other device, to produce a computer implementation process and cause the instructions executed on the computer or other programmable apparatus to provide a process used to achieve the functions and actions specified in this text.

It should also be noted that in certain alternative implementations, the functions/operations in the blocks may take place in a sequence other than that shown in the flow diagrams. For example, two blocks presented successively may actually be executed at basically the same time, or these blocks may be executed in reverse order at times. The specifics depend on the functions/operations involved. Even though a specific sequence of steps is presented, disclosed, and required, it should be understood that the steps may be implemented in any order, separately, or combined, unless otherwise noted, and shall still benefit from this disclosure.

This Description uses examples to disclose this invention, including best modes, and it enables any persons skilled in the art to implement this invention, including fabricating or using any device or system and executing any method covered. The scope of patent protection of this invention is defined by the Claims, and it may include other examples envisioned by a person skilled in the art. If such other examples have structural elements that do not differ from the literal language of the Claims, or if they include equivalent structural elements with no substantive difference from the literal language of the Claims, they are intended to fall within the scope of the Claims.

What is claimed is:

1. A maintenance monitoring device for passenger transport systems, characterized in that it comprises:
    a radio beacon, which is installed at an on-site check point of a passenger transport system and is used to broadcast radio signals toward its surroundings; and
    a personal mobile terminal, which is carried by maintenance workers and is used to sense radio signals when the maintenance workers approach the corresponding radio beacon;
    wherein the personal mobile terminal and/or the radio beacon is configured to calculate the time period information of radio signals broadcast by the corresponding radio beacon and continuously sensed by the personal mobile terminal;
    wherein the personal mobile terminal comprises:
    a time period information generation unit, which is configured to calculate the time period information of radio signals broadcast by the corresponding radio beacon and continuously sensed by the personal mobile terminal; and
    a compliance determination unit, which is configured to determine the compliance of the maintenance operations of the maintenance workers at an on-site check point of the corresponding radio beacon based on the time period information.

2. A maintenance monitoring device for passenger transport systems, characterized in that it comprises:
    a radio beacon, which is installed at an on-site check point of a passenger transport system and is used to broadcast radio signals toward its surroundings; and
    a personal mobile terminal, which is carried by maintenance workers and is used to sense radio signals when the maintenance workers approach the corresponding radio beacon:
    wherein the personal mobile terminal and/or the radio beacon is configured to calculate the time period information of radio signals broadcast by the corresponding radio beacon and continuously sensed by the personal mobile terminal;
    a maintenance management terminal, wherein the maintenance management terminal comprises:
    a time period information acquisition unit, which is used to receive the time period information from the personal mobile terminal or radio beacon; and
    a compliance determination unit, which is used to determine the compliance of the maintenance operations of the maintenance workers at an on-site check point of the corresponding radio beacon based on the time period information.

3. The maintenance monitoring device according to claim 2, characterized in that the compliance determination unit is also configured to: determine that the maintenance operations of the maintenance worker at a corresponding on-site check point are in compliance when the length of time in the time period information is greater than or equal to a corresponding maintenance time threshold, and if not, determine that the maintenance operations of the maintenance worker at a corresponding on-site check point are not in compliance.

4. The maintenance monitoring device according to claim 3, characterized in that the compliance determination unit is also configured to compare the maintenance track information to predetermined maintenance track information to determine the compliance of the maintenance operations of maintenance workers.

5. The maintenance monitoring device according to claim 2, characterized in that the maintenance management terminal also comprises:
    a prompt information generation unit, which is used to generate corresponding prompt information when the determined compliance results are not in compliance; and
    a transmission unit, which is used to transmit at least the prompt information to the personal mobile terminal.

6. The maintenance monitoring device according to claim 2, characterized in that the radio beacon has a corresponding first identifier, the personal mobile terminal has a corresponding second identifier, and the first identifier is broadcast when the radio signals are broadcast;
    the personal mobile terminal is also configured to identify the first identifier while sensing the radio signals and to generate and transmit time period information including the first identifier and second identifier.

7. The maintenance monitoring device according to claim 1, characterized in that the personal mobile terminal or the maintenance management terminal also comprises:
a maintenance track generation unit, which is configured to generate maintenance track information corresponding to multiple on-site check points based on the chronological relationships of the time period information corresponding to these multiple on-site check points.

8. The maintenance monitoring device according to claim 1, characterized in that the personal mobile terminal or the maintenance management terminal also comprises:
a prompt information generation unit, which is used to generate corresponding prompt information when the determined compliance results are not in compliance.

9. The maintenance monitoring device according to claim 1, characterized in that the radio beacon has a corresponding first identifier, and the radio beacon broadcasts the first identifier while broadcasting the radio signals.

10. The maintenance monitoring device according to claim 9, characterized in that the personal mobile terminal is also configured to identify the first identifier while sensing the radio signals and determine the on-site check point corresponding to the time period information based on the identified first identifier.

11. The maintenance monitoring device according to claim 1, characterized in that the radio beacon is a Bluetooth module and the radio signals are Bluetooth signals, or the radio beacon is a low-power Bluetooth module and the radio signals are low-power Bluetooth signals, or the radio beacon is a Wifi module and the radio signals are Wifi signals.

12. The maintenance monitoring device according to claim 1, characterized in that the radio beacon is configured to broadcast the radio signals within a predetermined range toward its surroundings;
the personal mobile terminal is also configured to determine whether it has entered the predetermined range by determining the signal strength of the radio signals it senses, thereby determining whether the maintenance worker is approaching the radio beacon.

13. The maintenance monitoring device according to claim 1, characterized in that the personal mobile terminal is configured to be able to automatically sense the radio signals when a wireless connection with the radio beacon has not been established.

14. A maintenance monitoring method for passenger transport systems, characterized in that it comprises:
sending radio signals broadcast by a radio beacon of an on-site check point installed on the passenger transport system; and
calculating the time period information of continuously sensed radio signals broadcast by the corresponding radio beacon;
generating maintenance track information corresponding to multiple on-site check points based on the chronological relationships of the time period information corresponding to these multiple on-site check points;
determining compliance of maintenance operations of a maintenance worker at an on-site check point of the corresponding radio beacon based on the time period information and/or the maintenance track information.

15. A computer device, comprising a memory, processor, and computer program stored in the memory and which can be run on the processor, characterized in that when the processor executes the program, the method of claim 14 is implemented.

16. A non-transitory computer-readable storage medium, on which a computer program is stored, characterized in that this program is executed by a processor to implement the method of claim 14 is implemented.

17. A personal mobile terminal used to monitor the maintenance of passenger transport systems by maintenance workers, which can be carried by the maintenance workers; characterized in that the personal mobile terminal comprises:
a close-range communications unit, which is configured to sense radio signals broadcast by a radio beacon of an on-site check point installed on the passenger transport system; and
a time period information generation unit, which is configured to calculate the time period information of the radio signals broadcast by a corresponding radio beacon and continuously sensed by the close-range communications unit;
wherein the close-range communications unit is also configured to identify the first identifier of the radio beacon, and the time period information generation unit is also configured to generate time period information including the first identifier and the second identifier of the personal mobile terminal.

18. A maintenance management terminal, which is used to monitor the maintenance of passenger transport systems by maintenance workers, characterized in that, at a minimum, the maintenance management terminal can establish a wireless connection with a personal mobile terminal carried by a maintenance worker; the maintenance management terminal comprises:
a time period information acquisition unit, which is used to receive time period information from the personal mobile terminal or a radio beacon installed at an on-site check point of the passenger transport system, wherein the time information is the time during which the personal mobile terminal continuously senses the radio signal broadcast by a corresponding radio beacon; and
a compliance determination unit, which is used to determine the compliance of the maintenance operations of the maintenance workers at an on-site check point of the corresponding radio beacon based on the time period information.

* * * * *